United States Patent [19]
Dupuy

[11] Patent Number: 5,423,147
[45] Date of Patent: Jun. 13, 1995

[54] WIRELESS CARRIER WEATHERSTRIP SEAL

[75] Inventor: Ronald E. Dupuy, Wabash, Ind.

[73] Assignee: GenCorp Inc., Fairlawn, Ohio

[21] Appl. No.: 197,900

[22] Filed: Feb. 17, 1994

[51] Int. Cl.⁶ .............................................. E06B 7/16
[52] U.S. Cl. ................................. 49/490.1; 49/496.1; 49/498.1
[58] Field of Search ................. 49/490.1, 498.1, 475.1, 49/496.1

[56] References Cited

U.S. PATENT DOCUMENTS

| | | |
|---|---|---|
| 3,333,381 | 8/1967 | Stark et al. |
| 4,263,750 | 4/1981 | Hein. |
| 4,370,832 | 2/1983 | Koike. |
| 4,461,507 | 7/1984 | Minami et al. |
| 4,474,402 | 10/1984 | Shelton ................. 49/490.1 X |
| 4,530,186 | 7/1985 | Guillon. |
| 4,617,220 | 10/1986 | Ginster. |
| 4,619,077 | 10/1986 | Azzola et al. |
| 4,676,856 | 6/1987 | Shigeki et al. |
| 4,678,227 | 7/1987 | Castagno. |
| 4,702,039 | 10/1987 | Bocchinfuso. |
| 4,745,016 | 5/1988 | Hashimoto et al. |
| 4,756,944 | 7/1988 | Kisanuki. |
| 4,787,668 | 11/1988 | Kawase et al. |
| 4,813,733 | 3/1989 | Gustafson et al. |
| 4,819,381 | 4/1989 | Kitaura et al. |
| 4,848,035 | 7/1989 | Sakuma et al. |
| 4,851,067 | 7/1989 | Ogawa et al. |
| 4,854,079 | 8/1989 | Karibe et al. |
| 4,929,490 | 5/1990 | Iwasa. |
| 4,949,507 | 8/1990 | Vaughan. |
| 4,952,442 | 8/1990 | Warner. |
| 4,959,081 | 9/1990 | Mathellier. |
| 4,970,102 | 11/1990 | Guillon. |
| 4,989,369 | 2/1991 | Maass. |
| 4,989,371 | 2/1991 | Mancosu et al. |
| 5,007,202 | 4/1991 | Guillon. |
| 5,014,464 | 5/1991 | Dupuy et al. |
| 5,029,931 | 7/1991 | Asaba et al. ................. 49/490.1 X |
| 5,032,444 | 7/1991 | Desir, Sr. |
| 5,038,522 | 8/1991 | Nozaki. |
| 5,042,201 | 8/1991 | Vaughn. |
| 5,050,349 | 9/1991 | Goto et al. |
| 5,067,281 | 11/1991 | Dupuy. |
| 5,072,546 | 12/1991 | Ogawa. |
| 5,106,149 | 4/1992 | Glossop et al. |
| 5,143,760 | 9/1992 | Mistopoulos. |

OTHER PUBLICATIONS

Article: "Foamable Hot Melt Weatherstrip Sealant", prepared by National Starch and Chemical Company.
Article: "Technical Information", H. B. Fuller Automotive Products, Inc., Warren, Mich.

*Primary Examiner*—Philip C. Kannan
*Attorney, Agent, or Firm*—Robert F. Rywalski; Louis J. Weisz

[57] ABSTRACT

A weatherstrip seal comprises a carrier structure without reinforcement which has an attached weather-sealing structure extending therefrom. The carrier structure has two spaced-apart walls connected by a base forming an interposed channel which is partially filled with a foamed, hot-melt adhesive. The carrier structure is adapted to fit over an anchoring mounting flange, while the weather-sealing surface has a sealing surface that prevents the entry of the elements through joined components moveable relative to each other.

9 Claims, 1 Drawing Sheet

WIRELESS CARRIER WEATHERSTRIP SEAL

TECHNICAL FIELD

This invention relates to improved weatherstrip profiles. More particularly, this invention relates to weatherstrip profiles useful for sealing moveable components, especially for sealing moveable closures furnished as coverings for openings providing access to enclosed areas in automobiles, trucks, and other vehicles. Specifically, this invention relates to weatherstrip profiles that do not require reinforcement, particularly metal reinforcement, to secure them to flanges provided around the perimeter of such openings.

BACKGROUND OF THE INVENTION

In many instances where an object is fabricated from several components, there is a need for the points of juncture of the components to be sealed in order to provide the area enclosed by the components with protection, for instance, from penetration by the elements. Such sealing needs are, for instance, exemplified in the case of vehicles by a need to seal the juncture between the doors, trunk lids, and hoods, and the enclosed spaces associated therewith. Such sealing is typically accomplished by the provision of profile strips formed from a material, for example, rubber that includes a relative soft portion, which forms the weatherproof seal, and a harder portion which serves as a carrier for the sealing portion. The carrier portion is commonly provided with a channel formed between two opposed walls connected by a base, designed to accept the insertion of a flange fabricated, for instance, from the sheet metal used to form the vehicles, the flange being located around the enclosed space to be protected.

The method for attaching such profiles involves the placement of the profile channel over the flange, the profile being retained by the frictional force of its channel walls against the flange. When so positioned, the sealing portion of the profile is desirably held in a sealing position.

While the installation of profiles of the type described is readily accomplished, the continual forces applied to the profiles as a consequence of the repeated opening and closing of the doors, trunk lids, hoods, and the like, have a tendency to gradually mis-position the profiles from their sealing location, often leading to failure of the seals.

As a consequence of the foregoing, weatherstrip profiles of the type described are commonly fabricated with reinforcement, for example, reinforcing metal embedded or encased in the carrier. This construction, together with the use of relatively dense rubber employed in forming the channel is designed to enhance the gripping action of the channel on the flanges over which the channel is positioned. However, while the reinforcement-containing carrier is normally available in a range of configurations and sizes that can be individually designed to provide both the required retention and sealing functionality, such devices, nevertheless, have certain inherent disadvantages that are difficult to avoid. Among such disadvantages may be mentioned the additional cost of fabricating reinforced sealing profiles, including the cost of the added operations required for their fabrication compared to unreinforced profiles, as well as the cost of the additional inventory involved. In addition, reinforced sealing profiles, particularly metal-reinforced profiles, are difficult to install around small radius corners without buckling or wrinkling, an effect giving rise to sealing leaks. Furthermore, the use of profiles with reinforcement, for instance encapsulated metal reinforcing, requires sturdier channel wall construction, in turn necessitating heavier profile construction, including the sealing portion of the profile. This has the unfortunate consequence of undesirably increasing compression load deflection of the installed profile, that is, the force required to seat the closure portion of the components whose sealing relationship is required. A further disadvantage of weatherstrips of the prior art is their tendency to become disengaged from the flange on which they are mounted, due to failure of the frictional retentive forces despite the contained metal reinforcement.

In view of the preceding, therefore, it is a first aspect of this invention to provide an improved weatherstrip seal profile.

A second aspect of this invention is to provide weatherstrip seals that are less expensive to fabricate than many of those of the prior art.

Another aspect of this invention is to provide a weatherstrip seal profile that has the ability to traverse relatively small radii without wrinkling or buckling.

Another aspect of this invention is to provide weatherstrip seals that can be anchored more securely to the mounting flanges with which they are associated.

A further aspect of this invention is to provide weatherstrip seals characterized by possessing relatively low compression load deflections.

An additional aspect of this invention is to provide weatherstrip seals that include carriers that have no reinforcement, particularly metal reinforcement therein.

Yet another aspect of this invention is to provide a weatherstrip profile having a channel containing an anchoring, foamed, hot-melt adhesive.

BRIEF DESCRIPTION OF THE INVENTION

The preceding and still further aspects of the invention are provided by improvements to profiles of the prior art comprising a carrier structure having two opposing walls that define a channel therebetween and being connected by a base, the walls being reinforced, for example, with metal and adapted to grip a profile-mounting flange positioned in the channel. Extending from the carrier, and attached thereto, is a weather-sealing structure that is provided with a sealing surface. The improvements of the invention comprise a profile that contains no embedded reinforcement, particularly encased, reinforcing metal, and that is provided with a channel containing a hot-melt adhesive.

The preceding and yet other aspects of the invention are provided by improvements to the profiles of the prior art described in the preceding paragraph comprising a carrier that contains no metal or other reinforcement encased therein and in which the carrier has a Shore A hardness of from about 70–100. Such improvements also include a carrier whose channel contains a hot-melt adhesive having a viscosity of about 10,000–20,000 centipoise, and which contains entrapped nitrogen bubbles.

The preceding and still additional aspects of the invention are provided by a vehicle fabricated with a profile having the improvements described in the preceding paragraphs.

BRIEF DESCRIPTION OF THE DRAWINGS

The invention will be better understood when reference is had to the following figures, in which like-numerals refer to like-parts, and in which.

DETAILED DESCRIPTION OF THE INVENTION

Figure 1:
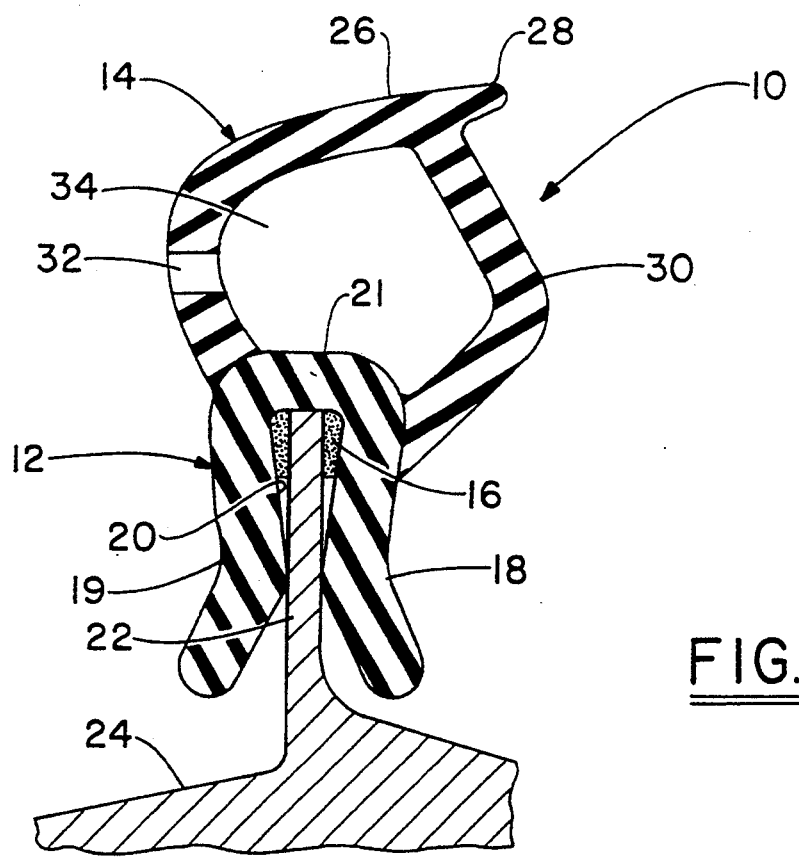
FIG. 1 is cross-sectional view of a profile of the invention mounted on a mounting flange.

FIG. 1 is a cross-sectional view of a profile of the invention, generally 10, mounted on a mounting flange 22. As shown, the profile 10 comprises a carrier structure, generally 12, from which a seal structure, generally 14, extends. The seal structure 14 of the Figure has a bulbular configuration in which walls 30 enclose a space 34. A vent hole 32 is shown through which air enters and leaves the enclosed space 34, depending on whether the weather-strip seal is in its compressed or expanded position, the Figure illustrating the expanded position. The outer surface 26 of the seal structure serves as a sealing surface, and in the embodiment shown has an extending lip 28 which serves as an extension of such surface.

The bulbular seal structure 14 extends from, and is attached to carrier structure 12. The latter structure comprises two opposed carrier walls, 18 and 19, respectively, connected by a base 21, and contains a foamed hot-melt adhesive 16 in the channel 20 between the walls.

Extending into the carrier channel 20, formed between the opposing walls 18 and 19 is a weatherstrip mounting or "pinchweld" flange 22 which is an extension of the sheet metal body with which the weatherstrip seal 10 is associated.

Among other things, the thickness of the seal wall 30 determines the force which must be exerted on the weatherstrip seal 10 in order to effect a sealing relationship between the components to be sealed. The wall thickness may vary within fairly broad limits; however, in the profiles of the invention, the walls will usually only be from about 1 to 3 mils thick. One of the advantages of the invention is that thinner seal walls 30, and therefore reduced sealing pressure, become possible as a consequence of the fact that the carrier walls 18, 19 from which the seal walls extend may be thinner, due to the absence of metal reinforcement therein.

With respect to the vent holes 32, a sufficient number will be provided to facilitate the passage of air during compression and expansion of the weatherstrip seal 10 when components are being sealed or unsealed, as for example, when an automobile door or trunk lid is closed or opened. Typically, the vent holes 32 will be spaced from about 6 to 12 inches apart and will be dimensioned to provide good air flow therethrough.

Referring again to the carrier structure 12, specifically to the hot-melt adhesive 16, the adhesive is conveniently introduced into the channel 20 as the weatherstrip seal 10 is being formed, for example, by extrusion. In a typical procedure, the adhesive will be heated to from about 250° F. to 350° F., prior to being injected into the channel. In order to achieve a secure anchoring of the carrier 12 on the mounting flange 22, it has been found desirable to fill approximately 10 to 30 percent of the cavity with the adhesive. However, in order to minimize the amount of hot-melt adhesive necessary for the filling operation, and therefore its cost, it has been found advantageous to inject nitrogen into the adhesive. Such injection produces entrapped bubbles and, therefore, increases the volume of the adhesive for a given weight. In order to retain the nitrogen bubbles in an entrapped condition, it is also desirable that the hot-melt maintain its viscosity over a relatively wide temperature range and that it retain its adhesive tack until it is installed on the mounting flange at a later point in time.

A wide variety of hot-melt adhesives are useful for purposes of the invention, it merely being necessary that they adhere to the rubber of the carrier 12 and to the flange 22, including a flange covered with paint. Adherence can readily be determined by empirical tests of the type with which those skilled in the art are familiar. Among useful hot-melt adhesives, for example, may be mentioned those based on polyamides, polyesters, polyolefins, epoxies, polyurethanes, ethylvinyl acetate and others. Although the formulations of most such adhesives are proprietary to their manufacturers, they are wellknown in the art and are readily obtainable.

Hot-melt adhesives of the type having a viscosity of from about 10,000 to about 20,000 centipoise at 350° F. have been found to be particularly useful for purposes of the invention. Such hot-melt adhesives are also well known to the art and are readily available commercially. Typical examples of suitable hot-melt products, for instance, are Instaweld 70–7556, marketed by National Starch and Chemical Co.; HL2081 hot-melt adhesive, available from H. B. Fuller Automotive Products, Inc., and similar products.

In instances where profiles are fabricated by extrusion, the hot-melt adhesive is conveniently introduced into the carrier channel 20 at the die and simultaneously foamed at that point. While a variety of gases can be used for foaming purposes, it has been found that inert gases, for example, nitrogen, are particularly desirable, and when introduced as indicated, they can reduce the amount of adhesive required as much as 20 percent or more.

Figure 2:
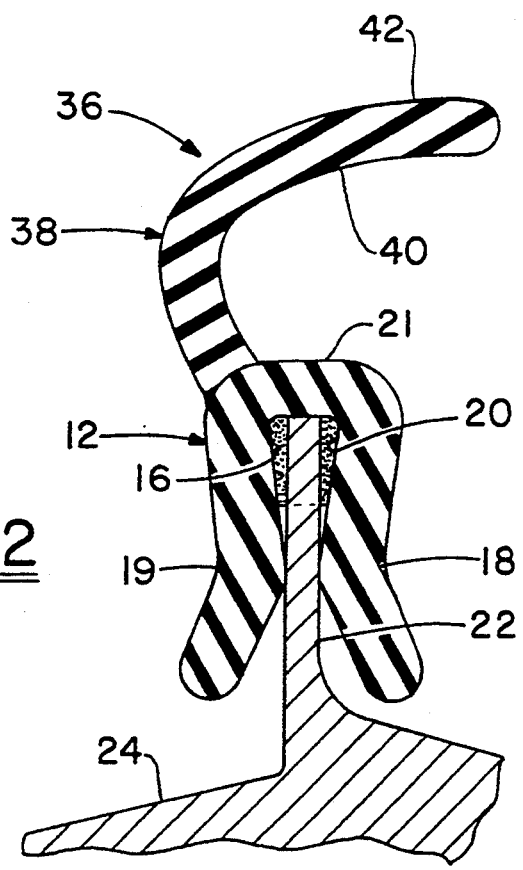
FIG. 2 is a cross-section view of a different profile embodiment of the invention mounted on a mounting flange.

FIG. 2 is a cross-section view of a different profile of the invention, generally 36, mounted on mounting flange 22. As in the case of the profile of FIG. 1, the profile weatherstrip seal comprises two basic parts, i.e., a seal structure 38, and a carrier structure 12. As previously explained in connection with the profile of FIG. 1, the carrier structure 12 includes two opposing carrier walls, 18 and 19, respectively, connected by a base 21, which provide a carrier channel between them. Again, a portion of the channel 20 is provided with a hot-melt adhesive 16, preferably foamed with an inert gas. As in the case of the embodiment of FIG. 1, the carrier channel 20 is inserted over a weatherstrip mounting flange 22, which forms an integral part of a sheet metal body 24. As will be seen from the Figure, the flange 22 extends into the hot-melt adhesive 16, which anchors it securely on the flange.

A seal structure 38 is attached to and extends from the carrier structure 12. In the case of the embodiment illustrated by FIG. 2, the seal structure 38 is a cantilevered, generally arcuate structure formed by seal wall 40, whose outer surface 42 provides a sealing surface.

As with the bulbular seal structure 14 of FIG. 1, the precise shape and dimensions of the seal structure 38 of FIG. 2 can be varied within a relatively wide range. However, although the bulbular configuration of FIG. 1 lends itself to uses in which the profile is required to traverse sharp corners, since it holds it dimensions well, the cantilevered configuration of FIG. 2 requires fewer additional fabrication steps, for example, following fabrication by extrusion, providing it with certain cost and other advantages.

The weatherstrip seal profiles of the invention can be fabricated from thermoplastics, elastomers, and thermoplastic elastomers, for example, from EPDM, neoprene, SBR, polypropylene, Santoprene, the latter being a product marketed by Advanced Elastomer Systems, as well as a variety of additional materials.

In order to enhance the gripping action of the carrier walls 18 and 19, relative to mounting flange 22, it has been determined to be desirable that the Shore A durometer hardness of the carrier 12 be from about 70 to 100, preferably about 90. In the case of the embodiment shown in FIG. 2, it is desirable that the seal wall 40 have a Shore A durometer hardness of about 50 to 70, preferably about 70.

In the case of the bulbular embodiment shown in FIG. 1, the walls 30 will conveniently be formed from sponge-like, foamed compounds.

Profiles according to the invention can be molded or coextruded in ways well-known to those skilled in the art.

Following fabrication, the extruded profiles can be cut to length to suit to the application envisioned. Advantageously, the profiles may be coated with lubricants, for example, silicon, urethane, or others to facilitate the sealing process when the components to be sealed are joined.

In addition to the superior sealing characteristics resulting from thinner walls and the relatively low compression load deflection (sealing force) associated therewith, the profiles of the invention exhibit superior retentiveness on flanges on which they are mounted as may be judged from the following extaction test.

EXAMPLE

In a comparison of the force required to extract a flange-like metal strip from a carrier, six metal blades, 100 mm long by 3 mm wide and 0.125 mm thick, are prepared. Three of the blades are inserted into profiles of the type illustrated in FIGS. 1 and 2 in which the carrier strip is provided with a hot-melt adhesive. The hot-melt used to anchor the blades in the carriers is Instaweld 70-7556, marketed by National Starch and Chemical Co., which has been foamed with nitrogen.

The remaining three of the blades are inserted into carrier channels, but with no hot-melt adhesive in the channels.

The assembled carrier/blades are then sequentially mounted in an Instron 4201 testing machine provided with a chart recorder and tested. The crosshead speed of the machine is set at 50 mm/min. and the force required to extract the blades from each of the samples is measured. The results of the test are indicated in the following table.

|  | With Hot-Melt | Without Hot-Melt |
| --- | --- | --- |
| Average | 159.6 Newtons | 23.9 Newtons |
| Sigma | 16.7 Newtons | 6.1 Newtons |

The results clearly illustrate the significantly larger extractive forces that must be exerted on the blades to remove them from the carriers in which the blades are embedded in hot-melt, thereby demonstrating that the profiles of the invention are more securely held on flanges on which they are installed.

While in accordance with the patent statutes, a preferred embodiment and best mode has been presented, the scope of the invention is not limited thereto, but rather is measured by the scope of the attached claims.

What is claimed is:

1. In a profile including:
   a carrier structure having two opposing walls defining a channel therebetween and being connected by a base, said walls being adapted to grip a profile-mounting flange positioned in said channel, and
   a sealing structure having a sealing surface, said sealing structure extending from said carrier structure, and being attached thereto,
   the improvement,
   wherein said carrier is fabricated without embedded reinforcement and said channel comprises opposing first and second truncated cavities meeting at their narrowest points to form a juncture adapted to grip said profile-mounting flange, and wherein said first cavity lies adjacent to said base and contains a hot-melt adhesive for retaining said profile mounting flange therein.

2. A profile according to claim 1, in which said hot-melt adhesive is foamed by the entrapment of gas therein and at least about 10 to 30 percent of said first cavity is filled with said foamed adhesive which contacts surfaces of said mounting flange, including a portion of its sides.

3. A profile according to claim 1, in which said sealing structure comprises a flexible wall enclosing a space, said wall having an outer surface and being provided with at least one vent opening, said outer surface functioning as said sealing surface.

4. A profile according to claim 3, in which said profile is formed by a dual extrusion, and said sealing structure is a foamed compound, while said carrier structure has a Shore A hardness of about 70–100.

5. A profile according to claim 1, in which said sealing structure comprises a flexible, cantilevered, arcuate wall, having an outer surface, said outer surface functioning as said sealing surface.

6. A profile according to claim 5, in which said sealing structure has a Shore A hardness of about 50–75, while the hardness of said carrier structure is about 70–100.

7. A profile according to claim 1, in which said hot-melt adhesive has a viscosity of about 10,000–20,000 centipoise at 350° F.

8. A vehicle having a profile according to claim 1 mounted thereon.

9. In a sealing profile including:
   a carrier structure having two opposing walls defining a channel therebetween and being connected by a base, said walls being adapted to grip a profile-mounting flange positioned in said channel, and
   a sealing structure having a sealing surface, said sealing structure extending from said carrier structure and being attached thereto,
   the improvement,
   wherein said carrier structure has a Shore A hardness of from about 70–100, and is fabricated without metal or other reinforcement, and
   wherein said channel comprises opposing first and second truncated cavities meeting at their narrowest points to form a juncture adapted to grip said mounting flange, and wherein said first cavity lies adjacent said base and contains a hot-melt adhesive having a viscosity of about 10,000–20,000 centipoise at 350° F. which contains entrapped nitrogen bubbles therein.

* * * * *